Oct. 5, 1965 K. SAHLE 3,209,985
CAPACITY CONTROL MECHANISMS
Original Filed March 23, 1961 2 Sheets-Sheet 1
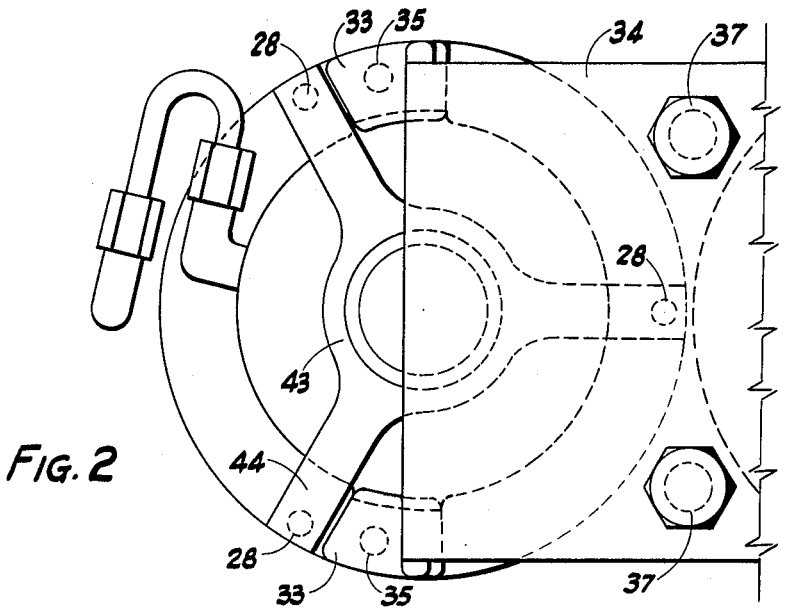
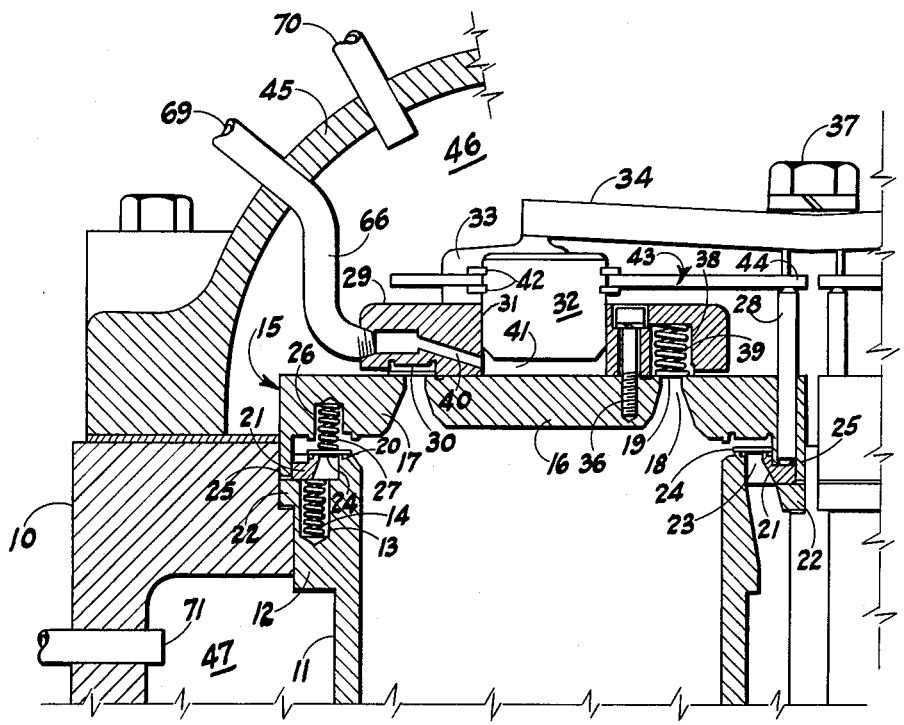
INVENTOR.
KNUTE SAHLE
BY
ATTORNEY

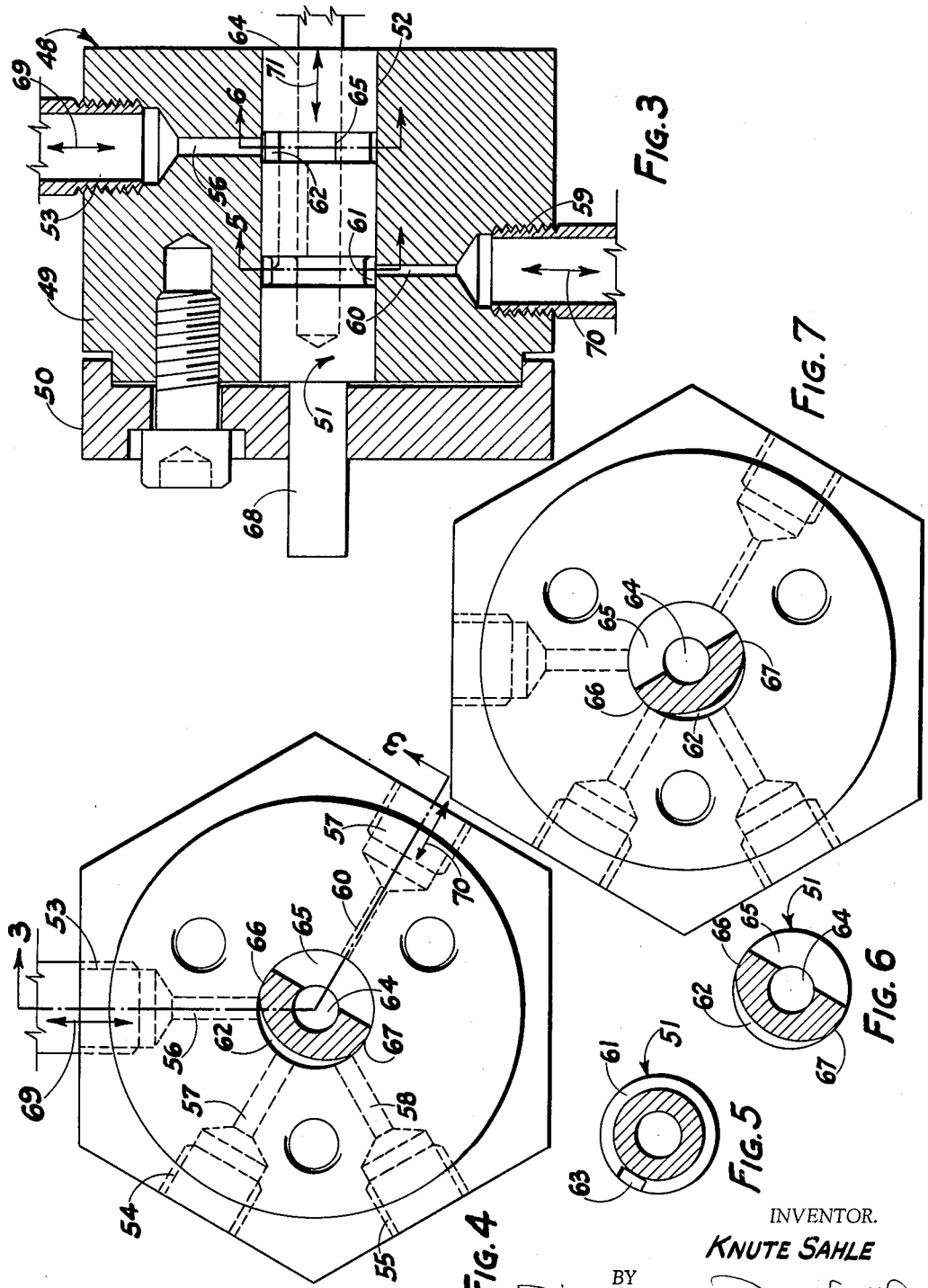

United States Patent Office 3,209,985
Patented Oct. 5, 1965

3,209,985
CAPACITY CONTROL MECHANISMS
Knute Sahle, West Manchester Township, York County, Pa., assignor to Borg-Warner Corporation, Chicago, Ill., a corporation of Illinois
Continuation of application Ser. No. 97,950, Mar. 23, 1961. This application July 11, 1963, Ser. No. 295,596
6 Claims. (Cl. 230—31)

This application is a continuation of application Ser. No. 97,950, filed Mar. 23, 1961, now abandoned.

This invention relates to compressors and, more particularly, to compressor unloaders and control means therefor.

In my Patent No. 2,763,425, owned by the assignee of this application, I show a compressor having an unloader, in which the unloader operates by holding the inlet valve away from its seat, the valve being a thin annulus which encircles the cylinder bore and co-acts with an annular valve seat. The annular valve seat is divided into two concentric annular seat surfaces separated by an annular inlet port. One seat surface is fixed and the other is movable in the direction of the cylinder axis to a position in which it prevents the annular valve from seating on the fixed annular seat surface.

My present invention is directed to a similar type unloader and, specifically, to an apparatus for translating the movable annular seat surface from its first position, in which it is in the same plane as the fixed seat surface, to a second position above the fixed seat surface to prevent the annular valve from seating.

My invention is further directed to a specific control mechanism for actuating the apparatus which translates the movable seat surface.

It is an object of the invention to provide a cylinder unloading mechanism of the movable valve seat type, which is easily constructed, assembled and serviced in conjunction with the particular compressing mechanism; furthermore, one that is simple and trouble-free in operation. Yet another object is to provide a control for a cylinder unloader of the type just above-mentioned, wherein the control comprises but one movable member which is rotatable within a housing to actuate a cylinder unloading mechanism (or a plurality, as may be desired) for loading or unloading a particular cylinder.

The invention consists of the novel constructions, arrangements and devices to be hereinafter described and claimed for carrying out the above-stated objects and such other objects as will appear from the following description of a preferred embodiment of the invention described with reference to the accompanying drawings, in which:

FIG. 1 is a fragmentary axial section through a cylinder of a single acting compressor with the unloading valve in its loaded position;

FIG. 2 is a partial plan of the compressor shown in FIG. 1 with the head removed to better show interior details;

FIG. 3 is a view in axial section of the control mechanism for actuating the unloading valve mechanism and taken on a line 3—3 of FIG. 4;

FIG. 4 is a plan of the control mechanism, as seen in FIG. 3, with the rotatable valve plunger thereof in section;

FIGS. 5 and 6 are sections taken respectively on lines 5—5 and 6—6 of FIG. 3; and FIG. 7 is a view similar to FIG. 4 but showing the rotatable valve plunger in its rotated position.

Like numerals refer to like parts throughout the several views.

A cylinder housing 10 is provided and is machined to receive a cylinder 11 therein. Cylinder 11 is provided with a plurality of upstanding bosses 12 at intervals around its upper periphery. Bosses 12 are bored as at 13 to provide housings for coiled compression springs 14.

A valve plate 15 seats on cylinder 11 and includes a central disc portion 16 and a peripheral portion 17. Peripheral portion 17 and disc portion 16 define between them a discharge area 18. A discharge valve 19 is seated on valve plate 15 covering discharge area 18.

The top end of cylinder 11 is provided with a rim 20, which defines one part of a suction valve seat. The other part of the suction valve seat is defined by an annular ring 21 encircling cylinder 11 and seated on upstanding bosses 12, and a continuous flange 22 encircling cylinder 11. The diameter of ring 21 is selected such that a suction passage 23 is provided between it and cylinder 11. A section valve 24 is seated on rim 20 and ring 21, covering suction passage 23. Valve plate 15 is provided with a marginal skirt 25, which serves to confine annular ring 21. Peripheral portion 17 of valve plate 15 is provided with a plurality of bores 26 in each of which is seated a coiled compression spring 27, bearing down on suction valve 24. The aforementioned coiled compression springs 14 bear on ring 21 from below, providing the force necessary to lift the ring 21 off bosses 12 carrying the suction valve 24 therewith. Springs 27 tend to maintain the suction valve in its closed position.

Valve plate 15 is drilled at selected points receive a plurality of rods 28 therethrough. The lower end of rods 28 bear on ring 21 to maintain the same on bosses 12 against the pressure exerted by springs 14. Means for raising and lowering rods 28 are hereinafter set out.

A discharge valve cage 29 is located on valve plate 15. Cage 29 is counterbored as at 30 to define the upper limit of movement of discharge valve 19. Cage 29 is further centrally bored as at 31, providing a recess to receive an unloader piston 32 therein. Cage 29 is further provided with a pair of upstanding bosses 33 for receiving a hold-down plate 34. Cage 29 is maintained concentric with valve plate 15 by means of a pair of pins 35, located one each in bosses 33. Pins 35 are each received in a corresponding bore (not shown) in valve plate 15. A plurality of bolts 36 (only one of which is shown) hold disc portion 16 against cage 29. A pair of bolts 37 pass through hold-down plate 34 and into housing 10 to maintain the housing, cylinder, valve plate and cage in assembled relationship.

Cage 29 is provided with a series of bores 38, each bore receiving therein a coiled compression spring 39 which bears against discharge valve 19 to maintain the same closed. Cage 29 is further provided with a passage 40 leading to a chamber 41, defined by the underside of piston 32, topside of valve plate 15, and bore 31, for purposes later to be explained.

Piston 32 is provided near the upper end thereof with a pair of retaining rings 42. Rings 42 receive a pressure plate 43 therebetween, which pressure plate terminates in outstanding fingers 44. Each finger 44 bears on a rod 28. A compressor cover plate 45 is provided and encloses a pressure discharge plenum 46. A suction plenum 47 is defined by cylinder housing 10 and cylinder 11. A piston (not shown) is provided for cylinder 11.

Means are provided to communicate chamber 41 with either the high pressure side or the low pressure side of the compressor, in order to control the unloading or loading respectively of suction valve 24. This takes the form of a capacity control valve 48. Capacity control valve 48 comprises a body portion 49, a top head portion 50, and a valve plunger 51. Body portion 49 is centrally bored as at 52 to receive valve plunger 51 therein. Three connection receiving bores 53, 54 and 55 are provided in valve body 49. Each terminates in a passage 56, 57 and 58 respectively, communicating with central bore 52. From an inspection of FIGS. 3 and 4, it will be apparent that connection receiving bores 53, 54 and 55 all lie in the same plane normal to the axis of bore 52. A connection receiving bore 59 is supplied in valve body 49 in a plane different from that of bores 53, 54 and 55, and communicates with a passage 60 terminating at central bore 52.

Valve plunger 51 is provided with an annular groove 61 and a semi-annular groove 62. An axial slot 63 connects grooves 61 and 62. Valve plunger 51 is further provided with a central bore 64. A slot 65 is provided in plunger 51, lying in the same plane as semi-annular groove 62 and 180° removed therefrom. Slot 65 intersects bore 64. A pair of lands 66 and 67 lie between groove 62 and slot 65 at each end of the groove. Valve plunger 51 is further provided with a reduced end 68 for receiving a handle of any suitable type. When valve plunger 51 is inserted within valve body 49, groove 61 lies in the same plane as connection receiving bore 59, while semi-annular groove 62 and slot 65 lie in the same plane as connection receiving bores 53, 54 and 55.

A line 69 connects passage 40 with connection receiving bore 53. Similar lines (not shown) go between connection receiving bores 54 and 55, and the applicable discharge valve cages on other cylinders (also not shown) in the machine. A line 70 leads from discharge plenum 46 to connection receiving bore 59 in valve body 49. Central bore 64 in valve plunger 51 is connected with suction plenum 47 by way of a line 71.

OPERATION

The machine shown is a multi-cylinder machine with only one cylinder being shown for the purposes of clarity. The operation described will be equally applicable to the other machine cylinders.

A connection receiving bore 53, 54, or 55 is provided for each cylinder (or group of cylinders) it is desired to unload in one step. Therefore, the operation described will be described only with respect to a single connection receiving bore 53, it being understood that the same is applicable to bores 54 and 55. It will be apparent that the number of connection receiving bores, such as bores 53, 54 and 55, may be varied according to the number of cylinders (or groups of cylinders) which it may be desirable to unload in a compressor in any one step.

In order to load any particular cylinder, ring 21 must be maintained on flange 22, so that the suction valve 24 may seat on rim 20 of cylinder 11. In order for this to happen, piston 32 must be in its lowermost position, which causes fingers 44 of pressure plate 43 to bear down on rods 28, maintaining ring 21 seated against the bias of springs 14. When piston 32 is raised to its upper limit of travel, springs 14 force ring 21 upwardly, which raises suction valve 24 off of rim 20, maintaining the particular cylinder unloaded.

Control valve 48 is provided to accomplish the aforesaid, as follows:

When it is desired to unload cylinder 11, valve plunger 51 is rotated to the position shown in FIG. 3, and high pressure gas from plenum 46 flows via line 70 to connection receiving bore 59 and thence through passage 60 into annular groove 61. From the annular groove 61, the gas flows via slot 63 into semi-annular groove 62. The high pressure gas then flows through passage 56 to connection receiving bore 53 and thence through line 69 into passage 40. From passage 40 the gas flows into chamber 41 on the underside of piston 32. Since the high pressure gas in plenum 46 is always acting on the top side of piston 32, high pressure gas in chamber 41 counterbalances this pressure and springs 14 then exert sufficient pressure to force ring 21 off bosses 12, carying suction valve 24 with it and unloading the cylinder. Ring 21 in its upward unloading movement, carries along with it rods 28. The rods act upwardly against fingers 44 of pressure plate 43, and the upward movement of the pressure plate lifts piston 32 therewith. The pressure on the opposite sides of the piston has been equalized, as aforementioned.

When it is desired to load a cylinder 11, then valve plunger 51 is rotated in a counter-clockwise direction, until such time as slot 65 is in communication with passage 56. This has the effect of communicating chamber 41 with the suction plenum 47. Land 66 then acts to segregate the high pressure gas in groove 62 from passage 56. High pressure gas within chamber 41 then flows by way of passage 40 and line 69 to connection receiving bore 53, whence it flows through passage 56 into slot 65. From slot 65 the gas flows via bore 64 and line 71 to suction plenum 47. This has the effect of lowering the pressure within chamber 41 to the lower pressure prevailing in the suction plenum 47. The high pressure gas within plenum 46, acting on the top side of piston 32, then exerts sufficient pressure on the piston to force it downwardly against the resistance of the lower pressure in chamber 41. Rods 28 are also forced downwardly by fingers 44 and serve to maintain ring 21 seated on bosses 12 against the upward pressure of coiled compression springs 14.

It will be apparent from the above that when it is desired to unload a cylinder, valve plunger 51 is rotated within valve body 49 to place semi-annular groove 62 in communication with any (or all) of the applicable passages 56, 57 or 58, thereby flowing high pressure gas into a chamber 41 and counter-balancing piston 32. When it is desired to load a cylinder, then the valve plunger 51 is rotated to place slot 65 in communication with a particular passage 56, 57 or 58 (or all) in order to vent the applicable chamber 41 to suction pressure, permitting the high pressure gas in plenum 46 to act on the top side of piston 32, forcing it downwardly.

I wish it to be understood that my invention is not to be limited to the specific constructions and arrangements shown and described, except only insofar as the claims may be so limited, as it will be apparent to those skilled in the art that changes may be made without departing from the principles of the invention.

What is claimed is:

1. In a compressor, a combined inlet and unloading valve mechanism comprising a cylinder sleeve enclosing a compressor working space, the sleeve affording an annular seat surface normal to the cylinder axis; means defining an inlet valve working space, a ring within said valve working space co-axially encircling said sleeve and guided to move axially relative thereto and spaced therefrom to define an inlet passage leading to said cylinder, said ring having a complementary annular seat surface normal to the cylinder axis; an annular valve capable of seating on both of said seat surfaces to close said inlet passage; and means controlling the movement of said ring between a first position, in which the complementary annular seat surface is in plane with the sleeve seat surface, and a second position, in which said complementary annular seat surface is displaced in the direction of the cylinder axis, said means including a reciprocable piston without said valve working space, means for continuously communicating compressor discharge pressure to one side of said piston, means for communicating either discharge or suction pressure to the other side of said piston, and means attached to said piston and movable therewith penetrating said valve working space and bearing on said co-axial ring.

2. The valve mechanism of claim 1 and spring means bearing on said co-axial ring and opposing said piston attached means.

3. In a compressor, a combined inlet and unloading valve mechanism comprising a cylinder sleeve enclosing a compressor working space, the sleeve affording an annular seat surface normal to the cylinder axis; means defining an inlet valve working space, a ring within said valve working space co-axially encircling said sleeve and guided to move axially relative thereto and spaced therefrom to define an inlet passage leading to said cylinder, said ring having a complementary annular seat surface normal to the cylinder axis; an annular valve capable of seating on both of said seat surfaces to close said inlet passage; and means for controlling the movement of said ring between a first position, in which the complementary annular seat surface is in plane with the sleeve seat surface, and a second position, in which said complementary annular seat surface is displaced "upwardly" in the direction of the cylinder axis, said means including a "vertically" reciprocable piston without said valve working space, means for continuously communicating compressor discharge pressure to the "top" side of said piston, means forming a chamber communicating with the other side of said piston, means for communicating either discharge or suction pressure to said chamber, means attached to said piston and movable therewith penetrating said valve working space and bearing on the "top" side of said co-axial ring, spring means bearing on the other side of said co-axial ring, whereby when suction pressure is communicated to said chamber, said piston-attached means maintains said co-axial ring in said first position against the bias of said spring means and when discharge pressure is communicated to said chamber, balancing the pressure across said piston, said spring means act to force said co-axial ring into its second position.

4. The valve mechanism of claim 3 wherein said piston attached means comprises a pressure plate attached to said piston and including a plurality of outstanding fingers, and rod means bearing on said co-axial ring and positioned to be engaged by said outstanding fingers.

5. In a combined inlet and unloading valve mechanism for a compressor of the type including a cylinder sleeve enclosing a compressor working space, the sleeve affording an annular seat surface normal to the cylinder axis; means defining an inlet valve working space, a ring within said valve working space co-axially encircling said sleeve and guided to move axially relative thereto and spaced therefrom to define an inlet passage leading to said cylinder, said ring having a complementary annular seat surface normal to the cylinder axis, an annular valve capable of seating on both of said seat surfaces to close said inlet passage, the combination with the ring and the complementary annular seat surface of means for controlling the movement of said ring between a first position, in which the complementary annular seat surface is in plane with the sleeve seat surface, and a second position, in which said complementary annular seat surface is displaced in the direction of the cylinder axis, said controlling means including a reciprocable piston without said valve working space, means attached to said piston and movable therewith penetrating said valve working space and bearing on said co-axial ring, spring means bearing on said co-axial ring and opposing said piston-attached means, and means for equalizing the forces acting on said piston and for unbalancing the forces acting on said piston.

6. In a combined compressor inlet and unloading valve mechanism of the type including a compressor working space, an annular valve controlling the admission of fluid to said working space, said valve being movable between a first operable position and a second inoperable position, the combination with said annular valve of means for controlling the movement of the valve between said first and second positions, said controlling means including a reciprocable piston, means attached to said piston and movable therewith bearing on said valve, means for continuously communicating compressor discharge pressure to one side of said piston and means for communicating either discharge or suction pressure to the other side of said piston, comprising means forming a chamber communicating with said other side of said piston, a bored valve body, means for communicating compressor discharge pressure to said valve body bore, means for communicating said chamber with said valve body bore, means for communicating compressor suction pressure to said valve body bore, and valve means in said bore movable from a first position, wherein said "discharge pressure" means and said chamber are connected, to a said position, wherein said "suction pressure" means and said chamber are connected.

References Cited by the Examiner
UNITED STATES PATENTS

| | | | |
|---|---|---|---|
| 2,155,236 | 4/39 | Newell | 230—30 |
| 2,334,633 | 11/43 | Lamberton | 230—30 |
| 2,673,025 | 3/54 | Labus et al. | 230—26 |
| 2,763,425 | 9/56 | Sahle | 230—30 |
| 2,936,106 | 5/60 | Larsson et al. | 230—30 |
| 2,956,729 | 10/60 | Nicholas | 230—30 |
| 2,971,690 | 2/61 | Nicholas | 230—30 |
| 2,973,132 | 2/61 | Hirsch | 230—30 |

LAURENCE V. EFNER, *Primary Examiner.*

JOSEPH H. BRANSON, JR., *Examiner.*